United States Patent
Wang

(10) Patent No.: US 9,487,354 B2
(45) Date of Patent: Nov. 8, 2016

(54) GLASS SUBSTRATE STORAGE PLATFORM

(71) Applicant: SHENZHEN CHINA STAR OPTOELECTRONICS TECHNOLOGY CO., LTD., Shenzhen, Guangdong (CN)

(72) Inventor: Yun Wang, Shenzhen (CN)

(73) Assignee: SHENZHEN CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 71 days.

(21) Appl. No.: 14/613,373

(22) Filed: Feb. 4, 2015

(65) Prior Publication Data

US 2015/0144579 A1 May 28, 2015

Related U.S. Application Data

(62) Division of application No. 13/379,009, filed on Dec. 17, 2011, now Pat. No. 9,004,839.

(51) Int. Cl.
*B65G 49/06* (2006.01)
*B65G 1/02* (2006.01)
*B65G 1/16* (2006.01)

(52) U.S. Cl.
CPC .............. *B65G 1/026* (2013.01); *B65G 1/16* (2013.01); *B65G 49/061* (2013.01); *B65G 49/062* (2013.01); *B65G 49/067* (2013.01); *B65G 49/068* (2013.01); *B65G 49/064* (2013.01)

(58) Field of Classification Search
CPC .......... B65G 1/026; B65G 1/16; B65G 7/08; B65G 47/06; B65G 47/244; B65G 49/067
USPC ...... 198/409; 211/41.14; 414/268, 269, 277, 414/416.03, 416.08, 762, 768, 771
See application file for complete search history.

(56) References Cited

U.S. PATENT DOCUMENTS

| | | | | |
|---|---|---|---|---|
| 4,613,032 A * | 9/1986 | Berger | ...... | B65G 7/08 198/409 |
| 5,209,627 A * | 5/1993 | Lisec | ...... | B07C 5/36 198/408 |
| 5,375,959 A * | 12/1994 | Trento | ...... | B65G 1/18 414/277 |
| 5,542,805 A * | 8/1996 | Lisec | ...... | B65G 49/068 414/277 |
| 5,738,482 A * | 4/1998 | Piazza | ...... | B65G 47/914 414/277 |
| 6,077,018 A * | 6/2000 | Lisec | ...... | B65G 49/062 414/269 |
| 6,648,572 B2 * | 11/2003 | Piazza | ...... | B65G 1/16 211/162 |
| 7,472,636 B2 * | 1/2009 | Bavelloni | ...... | B65G 49/067 225/96 |
| 7,549,833 B2 * | 6/2009 | Tang | ...... | B65G 49/067 414/737 |
| 7,878,754 B2 * | 2/2011 | Mercure | ...... | B65G 49/062 414/801 |
| 8,590,688 B2 * | 11/2013 | Weigl | ...... | B65D 85/48 198/346.1 |
| 8,757,355 B2 * | 6/2014 | Weigl | ...... | B65G 49/062 198/379 |
| 8,911,197 B2 * | 12/2014 | Rossmann | ...... | B65G 49/061 414/225.01 |

FOREIGN PATENT DOCUMENTS

EP      1473261 A1 * 11/2004 ........... B65G 49/067

* cited by examiner

*Primary Examiner* — James Keenan

(57) ABSTRACT

A glass substrate storage and transportation system is provided, including a storage platform and a transportation platform. The storage platform includes a plurality of storage housings for receiving the upright glass substrates. A glass substrate storage platform is also provided. The glass substrate storage and transportation system and the glass substrate storage platform adopt a vertical storage mode to store the glass substrates for solving the technical problems of the space utilization rate being low and the product having defect resulted by the particle pollution.

2 Claims, 5 Drawing Sheets

GLASS SUBSTRATE STORAGE PLATFORM

CROSS-REFERENCES TO RELATED APPLICATION

This is a division of U.S. application Ser. No. 13/379,009, filed on Dec. 17, 2011 and entitled "A Glass Substrate Storage and Transportation System and A Glass Substrate Storage Platform."

BACKGROUND OF THE INVENTION

1. Field of the Invention

The present invention relates to a glass substrate storage and transportation field, and more particularly to a glass substrate storage and transportation system and a glass substrate storage platform, being capable of improving the space utilization rate and reducing the particle pollution on the glass substrate.

2. Description of the Prior Art

A traditional glass substrate storage and transportation system employs stockers and a stacker crane to transport glass substrates. Each stocker loads the glass cassettes, each of which accommodates a plurality of glass substrates. The stacker crane can transport the glass cassettes of each stocker for transporting the glass substrates.

With the increasing of the size of the glass substrate and the production capacity, it means that the stocker needs to load the more and larger glass cassettes. And the stocker of the larger volume will take up more space.

Moreover, the mechanical wear or other factors will result in the problem of the particle pollution within the stocker is serious. Because the glass substrates are horizontally placed in the glass cassette by the traditional way, the glass substrates are easy to be polluted after being put for a long time. Furthermore, when the stacker crane moves, it easily causes the dust due to the heavy weight thereof. According to the prior experience, because of the pollution within the stocker, the proportion of the defective products will continuously increase as time goes on.

Hence, it is necessary to provide a glass substrate storage and transportation system and a glass substrate storage platform for solving the problem existing in the prior art.

BRIEF SUMMARY OF THE INVENTION

The present invention provides a glass substrate storage and transportation system and a glass substrate storage platform to solve the technical problems of the space utilization rate being low and the particle pollution within the stocker resulting in the defective products.

An object of the present invention is to provide a glass substrate storage and transportation system and a glass substrate storage platform, which adopt the vertical storage mode to store the glass substrates for improving the space utilization rate and preventing the glass substrates from being polluted.

To achieve the aforementioned object or other objects of the present invention, the present invention adopts the following technical solution.

A glass substrate storage and transportation system is provided, comprising a storage platform being used to store a glass substrate and a transportation platform being used to carry the glass substrate out from and onto the storage platform. The storage platform comprises a plurality of storage housings for uprightly receiving the glass substrate. The storage platform also comprises a storage plate for fixing the storage housings. Each of the storage housings includes a fixed support plate for fixedly supporting the glass substrate, a moveable support plate and a bottom plate. The bottom plate is connected to the storage plate by a retractable guideway. The retractable guideway is capable of making a stretching and retracting movement along a direction of carrying the glass substrate out and in. The moveable support plate includes a moveable pivot for making the moveable support plate be rotated relative to the transportation platform. A relative rotation angle of the moveable support plate relative to the transportation platform is 0 to 90 degrees. The transportation platform comprises a feeding unit for transporting the glass substrate and a feeding guideway for determining a transporting direction of the feeding unit. The moveable support plate includes at least two support portions and an interval portion formed between the two support portions. The feeding unit disposes a retaining portion, which is corresponding to the interval portion and is used to hold the glass substrate. The transportation platform specifically comprises a carry-out feeding unit for carrying the glass substrate out from the storage platform, a carry-out feeding guideway for determining a transportation direction of the carry-out feeding unit, a carry-in feeding unit for carrying the glass substrate onto the storage platform, and a carry-in feeding guideway for determining a transportation direction of the carry-in feeding unit. The number of the transportation platform is two. The two transportation platforms form a layer structure. There disposes a vertical guideway between the two transportation platforms. the vertical guideway is located on one end of the transportation guideway of each of the two transportation platforms for making the feeding unit move up and down. The storage plate is provided with a plurality of air holes located under the storage housings.

A glass substrate storage and transportation system comprises a storage platform being used to store a glass substrate and a transportation platform being used to carry the glass substrate out from and onto the storage platform. The storage platform comprises a plurality of storage housings for uprightly receiving the glass substrate.

In the glass substrate storage and transportation system of the present invention, the storage platform also comprises a storage plate for fixing the storage housings. Each of the storage housings includes a fixed support plate for fixedly supporting the glass substrate, a moveable support plate and a bottom plate. The bottom plate is connected to the storage plate by a retractable guideway. The retractable guideway is capable of making a stretching and retracting movement along a direction of carrying the glass substrate out and in.

In the glass substrate storage and transportation system of the present invention, the moveable support plate includes a moveable pivot for making the moveable support plate be rotated relative to the transportation platform. A relative rotation angle of the moveable support plate relative to the transportation platform is 0 to 90 degrees.

In the glass substrate storage and transportation system of the present invention, the transportation platform comprises a feeding unit for transporting the glass substrate and a feeding guideway for determining a transporting direction of the feeding unit.

In the glass substrate storage and transportation system of the present invention, the moveable support plate includes at least two support portions and an interval portion formed between the two support portions. The feeding unit disposes a retaining portion, which is corresponding to the interval portion and is used to hold the glass substrate.

In the glass substrate storage and transportation system of the present invention, the moveable support plate includes at least two support portions and an interval portion formed between the two support portions. The feeding unit disposes a fine-tuning wheel, which is corresponding to the interval portion and is used for holding the glass substrate and adjusting the position of the glass substrate.

In the glass substrate storage and transportation system of the present invention, the transportation platform specifically comprises a carry-out feeding unit for carrying the glass substrate out from the storage platform, a carry-out feeding guideway for determining a transportation direction of the carry-out feeding unit, a carry-in feeding unit for carrying the glass substrate onto the storage platform, and a carry-in feeding guideway for determining a transportation direction of the carry-in feeding unit.

In the glass substrate storage and transportation system of the present invention, the number of the transportation platform is two. The two transportation platforms form a layer structure. There disposes a vertical guideway between the two transportation platforms. The vertical guideway is located on one end of the transportation guideway of each of the two transportation platforms for making the feeding unit move up and down.

In the glass substrate storage and transportation system of the present invention, the storage plate is provided with a plurality of air holes located under the storage housings.

To achieve the aforementioned object or other objects of the present invention, the present invention also adopts the following technical solution. A glass substrate storage platform comprises a storage plate, a plurality of retractable guideways located on the storage plate and a plurality of storage housings for uprightly receiving a glass substrate. The storage housings are one-to-one corresponding to the retractable guideways. Each of the storage housings is fixed on the corresponding retractable guideway. Each of the storage housings includes a fixed support plate for fixedly supporting the glass substrate, a moveable support plate for movably supporting the glass substrate and facing the fixed support plate and a bottom plate for connecting the fixed support plate and the moveable support plate. The fixed support plate and the moveable support plate are perpendicular to the storage plate. The bottom plate is parallel to the storage plate. The bottom plate is connected to the corresponding retractable guideway.

In the glass substrate storage platform of the present invention, the storage plate is provided with a plurality of air holes located under the storage housings.

Comparing with the prior art, the glass substrate storage and transportation system and the glass substrate storage platform of the present invention adopt a vertical storage mode to store the glass substrates and adopt a retractable transportation mode, thereby solving the technical problems of the space utilization rate being low and the product having defect resulted by the particle pollution in the prior glass substrate storage and transportation system.

For more clearly and easily understanding above content of the present invention, the following text will take a preferred embodiment of the present invention with reference to the accompanying drawings for detail description as follows.

BRIEF DESCRIPTION OF THE DRAWINGS

FIGS. 2A and 2B are structural schematic views of a first preferred embodiment of a glass substrate storage and transportation system of the present invention, wherein FIG. 2A is a schematic view showing that when one of the glass substrates is carried out and now the glass substrate keeps an upright state, and FIG. 2B is a schematic view showing that the glass substrate of FIG. 2A is rotated and is horizontally placed onto a transportation platform;

FIGS. 3A to 3D are structural schematic views of a second preferred embodiment of the glass substrate storage and transportation system of the present invention, wherein FIG. 3A is a schematic view showing that one of the glass substrates is carried out and now the glass substrate keeps an upright state, FIG. 3B is a schematic view showing that the glass substrate of FIG. 3A is rotated and is horizontally placed onto a transportation platform, FIG. 3C is a schematic view showing that one of the glass substrates is ready to be carried in and now the glass substrate keeps a lying state, and FIG. 3D is a schematic view showing that the glass substrate of FIG. 3C is rotated 90 degrees to uprightly stand on a transportation platform.

DETAILED DESCRIPTION OF THE PREFERRED EMBODIMENTS

The following description of every embodiment with reference to the accompanying drawings is used to exemplify a specific embodiment, which may be carried out in the present invention. Directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but not to limit, the present invention.

Figure 1:
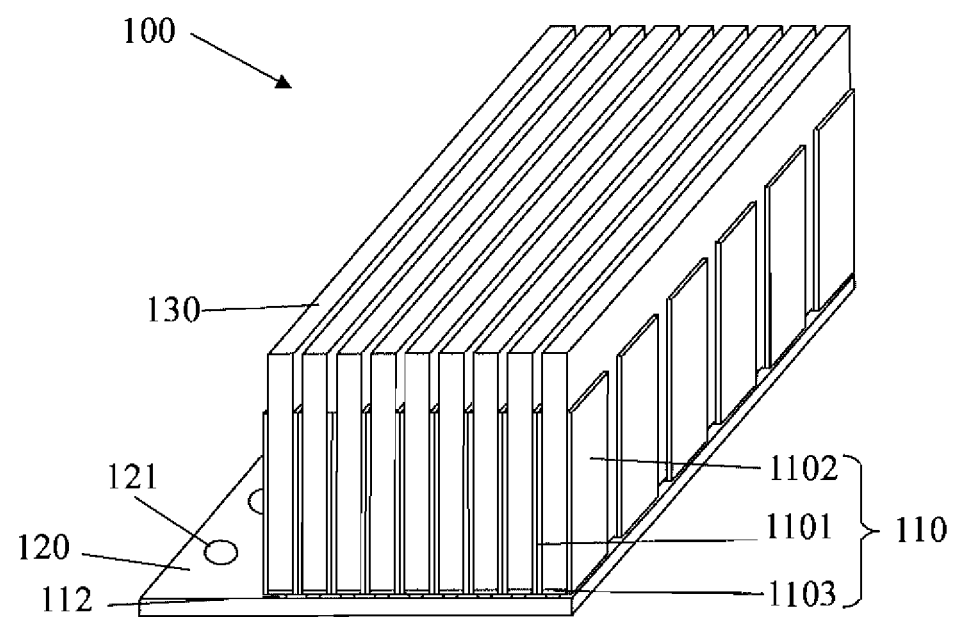
FIG. 1 is a structural schematic view of a preferred embodiment of a glass substrate storage platform of the present invention.

FIG. 1 shows a structural schematic view of a glass substrate storage platform used in a glass substrate storage and transportation system of the present invention. The storage platform 100 comprises a storage plate 120, a plurality of retractable guideways 112 mounted on the storage plate 120, and a plurality of storage housings 110 for receiving upright glass substrates 130. The storage housings 110 are one-to-one corresponding to the retractable guideways 112 and each storage housing 110 is fixed on the corresponding retractable guideway 112, so that the retractable guideways 112 are located on the storage plate 120. Each storage housing 110 includes a fixed support plate 1101 for fixedly supporting the glass substrate 130, a moveable support plate 1102 being parallel to the fixed support plate 1101 and for movably supporting the glass substrate 130, and a bottom plate 1103 for connecting the fixed support plate 1101 and the moveable support plate 1102. The fixed support plate 1101 and the moveable support plate 1102 are perpendicular to the storage plate 120, and the bottom plate 1103 is parallel to the storage plate 120. The bottom plate 1103 is fixed on the retractable guideway 112, so that the storage housing 110 is fixed on the retractable guideway 112. The storage plate 120 is provided with a plurality of air holes 121.

Referring to FIG. 1, when the glass substrate storage platform of the present invention is used, the glass substrate 130 is uprightly placed in the storage housing 110. Because the storage housing 110 can be stretched or retracted by the retractable guideway 112, the corresponding glass substrate 130 can be taken out or taken back. Therefore, the present invention need not specially reserve an operation space for the mechanical arm to transport the glass substrate 130. The space between the two adjacent glass substrates 130 may be reduced to 10 mm, but the size of the original glass cassette is 30 mm For example, if taking a glass substrate with the size of 2500 mm×2200 mm for an example and taking twenty glass substrates 130 as a group, the length of the glass substrate storage platform of the present invention is only 250 mm (according to the thickness of the glass substrate 130) and the volume thereof is 2500 mm×2200 mm×250 mm But if adopting the original glass cassette, it will need the glass cassette with the size of 2500 mm×2200 mm×600 mm, and also need to think of the height of 300 mm of lifting the glass cassette by the stacker crane and the height of a frame of the glass cassette itself. The height of the glass cassette is generally at least 1000 mm. Obviously, the glass substrate storage platform of the present invention compared with the traditional glass cassette may save about three-quarter volume. In the present invention, the glass substrate 130 is a single substrate. In order to avoid a coated surface of the glass substrate 130 to contact with the fixed support plate, the glass substrate 130 may be store by the way of being incompletely upright (such as an angle of 70 to 80 degrees from horizontal), so that a back surface of the glass substrate 130 leans against the moveable support plate 1102. But if the coated surface of the glass substrate 130 has been packed, the glass substrate 130 may be uprightly stored.

Moreover, the storage plate 120 of the glass substrate storage platform of the present invention is provided with a plurality of air holes 121. When the storage housing 110 is disposed on the storage plate 120, these air holes 121 are located under the storage housing 110. Because the glass substrate 130 is uprightly placed in the storage housing 110, the dust particle is not easy to adhere to the surface of the glass substrate 130. And besides, because the air flow between the glass substrates 130 is similar to the placed direction of the glass substrates 130, the dust particle on the surface of the glass substrate 130 is easier to be cleared. In addition, when the retractable guideway 112 moves together with the storage housing 130 for picking out the glass substrate 130, the falling dust particle cannot affect other glass substrates 130. Accordingly, the glass substrate storage platform of the present invention may largely reduce the defective glass substrate resulted by the dust particle.

Figure 2A:
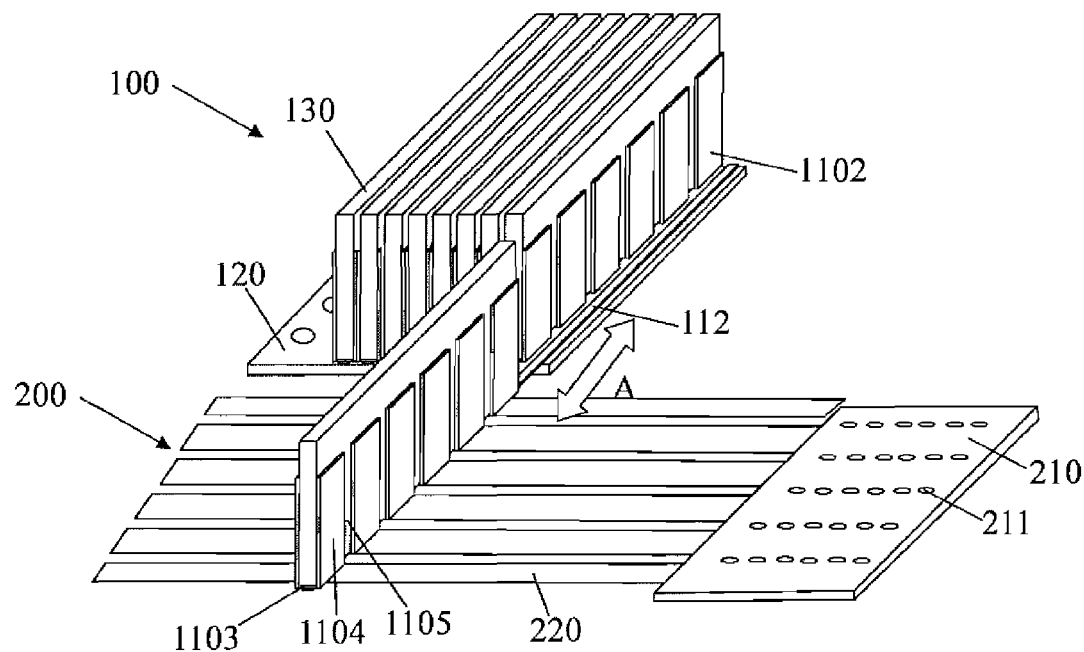
Figure 2B:
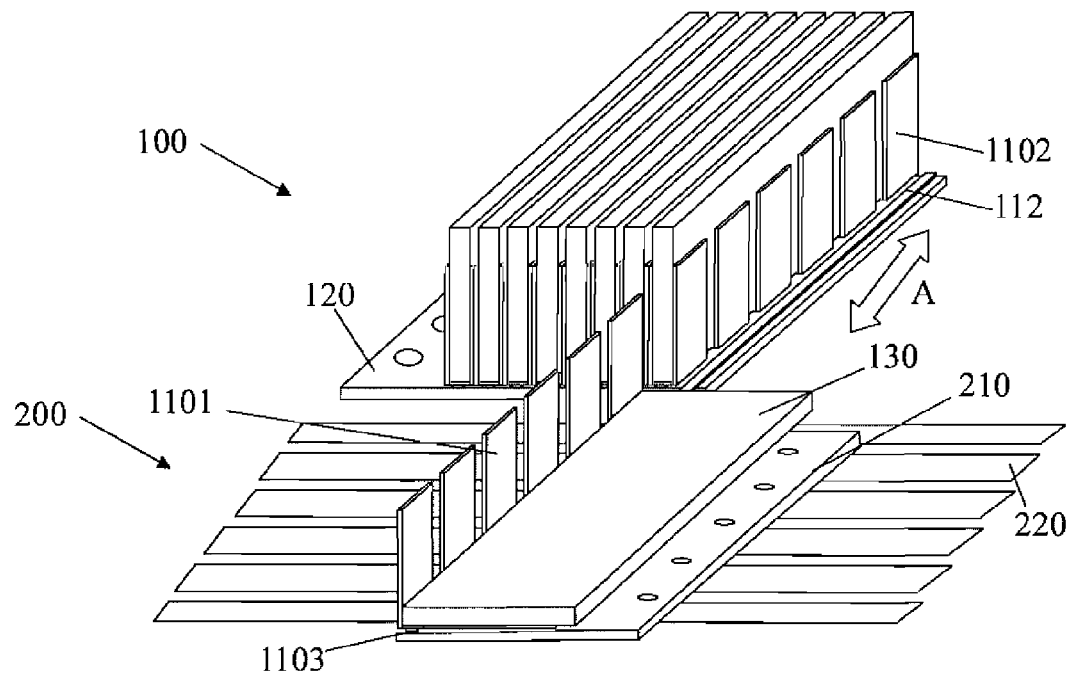

FIGS. 2A and 2B are structural schematic views of a first preferred embodiment of the glass substrate storage and transportation system of the present invention, wherein FIG. 2A is a schematic view showing that when one of the glass substrates is carried out and the glass substrate keeps an upright state, and FIG. 2B shows that the glass substrate of FIG. 2A is rotated and horizontally lies on a transportation platform. The glass substrate storage and transportation system comprises a storage platform 100 and a transportation platform 200. The storage platform 100 is used to store the glass substrates 130, and the transportation platform 200 is used to carry the glass substrates 130 out and in.

The storage platform 100 shown in FIGS. 2A and 2B is similar to the storage platform 100 shown in FIG. 1, so the similar components adopt the same numerals. And the components not shown in FIGS. 2A and 2B may refer to the components and the numerals thereof shown in FIG. 1. To be brief, in the embodiment shown by FIGS. 2A and 2B, the storage platform 100 comprises a storage plate 120, a plurality of retractable guideways 112 and a plurality of storage housings 110. Each storage housing 110 includes a fixed support plate 1101, a moveable support plate 1102 and a bottom plate 1103. The bottom plate 1103 of the storage housing 110 is fixed on the retractable guideway 112 so that it can move together with the retractable guideway 112 to be stretched from or retracted into the storage plate 120. The retractable guideway 112 may be stretched or retracted along the direction (as a direction A shown in FIG. 2A) of carrying the glass substrate 130 out from and onto the storage platform 100. The moveable support plate 1102 includes a moveable pivot (not shown in drawings), which can make the moveable support plate 1102 rotate relative to the bottom plate 1103. The relative rotation angle thereof is 0 to 90 degrees.

The transportation platform 200 comprises a feeding unit 210 for transporting the glass substrate 130 and a feeding guideway 220 for determining the transporting direction of the feeding unit 210. The moveable support plate 1102 includes at least two support portions 1104 and an interval portion formed between the two support portions 1104. The feeding unit 210 disposes a retaining portion 211, which is corresponding to the interval portion 1105 and is used to hold the glass substrate 130.

When the retractable guideway 112 located on the storage plate 120 carries the storage housing 110 and the glass substrate 130 placed in the storage housing 110 to be stretched out toward the transportation platform 200 and leave from the storage plate 120 to arrive at the feeding unit 210 located on the feeding guideway 220 of the transportation platform 200, the moveable support plate 1102 of the storage housing 110 is rotated relative to the transportation platform 200. Because the glass substrate 130 leans against the moveable support plate 1102, the glass substrate 130 will be rotated together with the moveable support plate 1102 until the glass substrate 130 lies on the retaining portion 211 of the feeding unit 210 of the transportation platform 200, and then the glass substrate 130 will be removed by the feeding unit 210 to the demanded position of the worker.

On the contrary, when the glass substrate 130 needs to be carried onto the storage plate 120, the retractable guideway 112 located on the storage plate 120 takes the empty storage housing 110 to be stretched out toward the transportation platform 200 and leave from the storage plate 120 to arrive at an upper surface of the feeding guideway 220 of the transportation platform 200, then the glass substrate 130 is transported onto the moveable support plate 1102 by the feeding unit 210 and the retaining portion 211 thereof. Now, rotating the moveable support plate 1102 can make the glass substrate 130 uprightly stand in the storage housing 110. Finally, the retractable guideway 112 takes the storage housing 110 with the glass substrate 130 to return to the storage plate 120.

When the glass substrate storage and transportation system of the present invention is used, the specific implementation mode and the beneficial effect of the storage platform 100 is similar to those of the glass substrate storage platform shown in FIG. 1, so please refer to the embodiment of the glass substrate storage platform shown in FIG. 1. The transportation platform 200 does not adopt the stacker crane, but adopts the feeding unit 210 and the feeding guideway 220, thereby largely reducing the failure rate of the equipment.

Figure 3A:
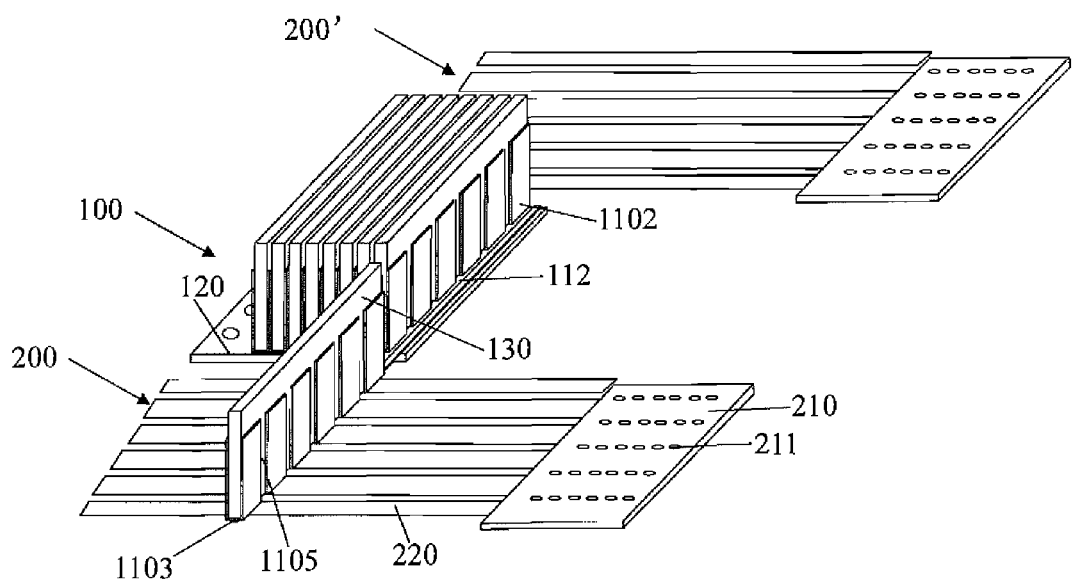
Figure 3B:
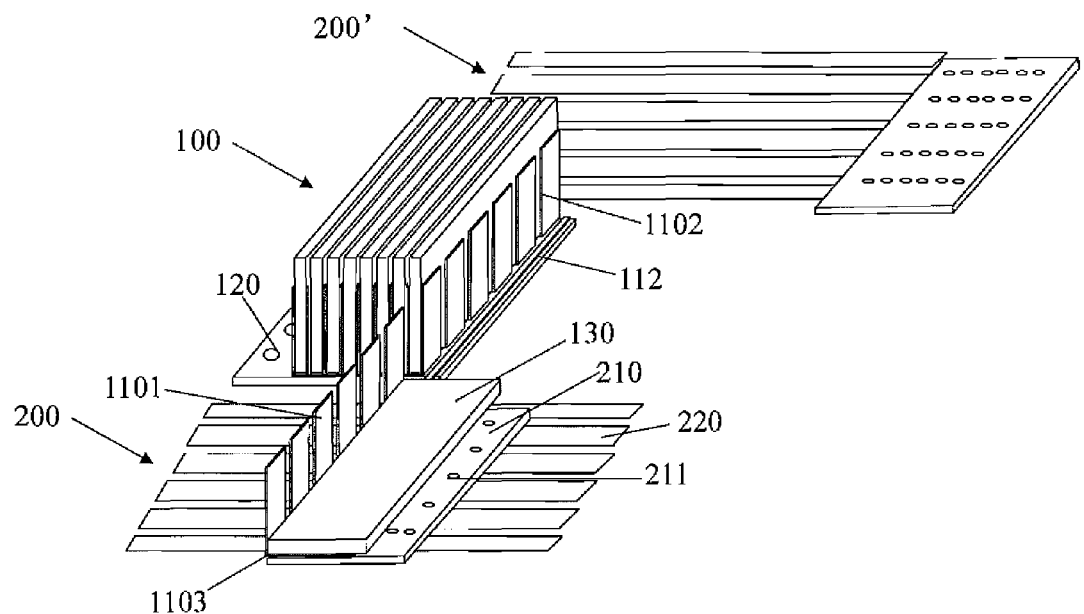
Figure 3C:
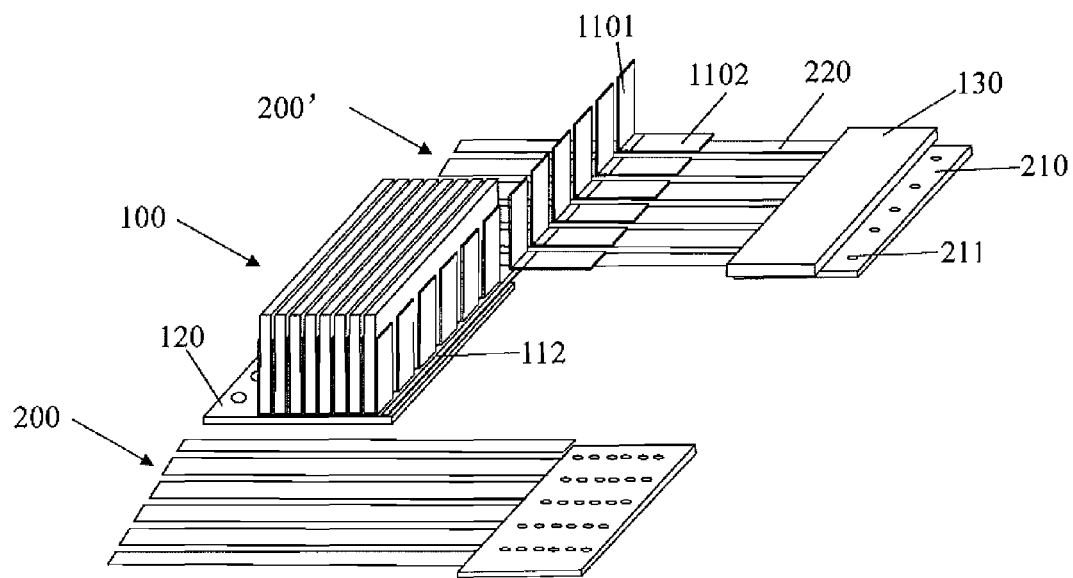
Figure 3D:
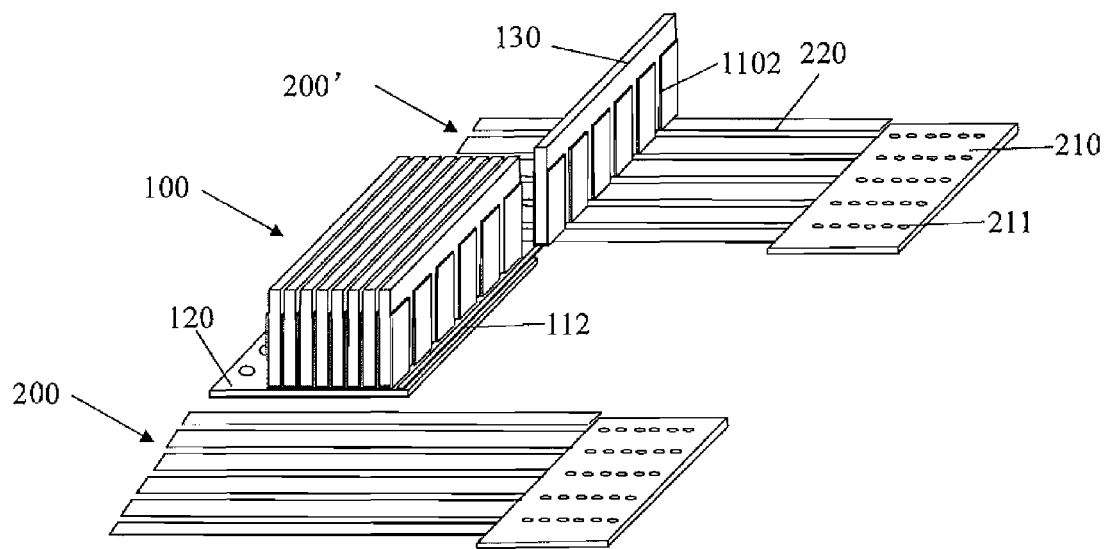

FIGS. 3A to 3D are structural schematic views of a second preferred embodiment of the glass substrate storage and transportation system of the present invention, wherein FIG. 3A is a schematic view showing that one of the glass substrates is carried out and now the glass substrate keeps an upright state, FIG. 3B is a schematic view showing that the glass substrate of FIG. 3A is rotated to lie on the transportation platform, FIG. 3C is a schematic view showing that one of the glass substrates is ready to be carried in and now the glass substrate keeps a lying state, and FIG. 3D is a schematic view showing that the glass substrate of FIG. 3C is rotated 90 degrees to uprightly stand on the transportation platform. The main difference between the first embodiment of FIGS. 2A and 2B and the second embodiment of FIGS. 3A and 3B is that: the second embodiment of FIGS. 3A and 3B employs two transportation platforms 200, 200' to be responsible for carrying the glass substrate 130 out and in, respectively.

Please refer to FIGS. 3A and 3B and simultaneously combine with the detail structures of the components of FIGS. 1 and 2, when the glass substrate 130 needs to be taken out, the storage housing 110 loaded with the glass substrate 130 can move together with the retractable guideway 112 to be stretched unto the transportation platform 200. The retractable guideway 112 is mounted in a drawer cabinet, one fixed end thereof is connected to the storage plate 120, and two moveable ends thereof are connected the bottom plate 1103. When the retractable guideway 112 is stretched or retracted, only the moveable ends can make the retractable guideway 112 be stretched, but the fixed end can not move. The stretching and retracting movement of the retractable guideway 112 may be driven by a cylinder. The retractable guideway 112 can be stretched one segment by one segment, and it has some strength being enough for supporting the weight of the glass substrate 130. Subsequently, the moveable support plate 1102 is rotated 90 degrees around the moveable pivot, so that the glass substrate 130 on the moveable support plate 1102 is placed onto the feeding unit 210 of the transportation platform 200 (as shown in FIG. 3B). Here, a servo motor can be employed to control the rotation angle and the rotation precision of the moveable pivot, and the mechanisms, such as a shaft coupling and so on can be employed to change the rotation direction of the moveable pivot of the moveable support plate 1102 for driving the moveable support plate 1102 to rotate. Now, the retaining portion 211 of the feeding unit 210 of the transportation platform 200 passes through the interval portion 1105 of the moveable support plate 1102 to hold the corresponding glass substrate 130. Finally, the feeding unit 210 moves along the feeding guideway 220 to output the corresponding glass substrate 130 to an entry-exit opening, so that the worker may take away the glass substrate 130.

Please refer to FIGS. 3C and 3D and simultaneously combine with the detail structures of the components of FIGS. 1 and 2, when the glass substrate 130 needs to be carried in, the glass substrate 130 is placed onto the feeding unit 210 of the transportation platform 200' and then is held by the retaining portion 211 of the feeding unit 210. Now, the moveable support plate 1102 is parallel to the transportation platform 200', so the feeding unit 210 can move along the feeding guideway 220 to transport the glass substrate 130 upon the moveable support plate 1102, and the retaining portion 211 of the feeding unit 210 is located in the interval portion 1105 of the moveable support plate 1102. Then, the moveable support plate 1102 can be rotated 90 degrees through the moveable pivot, so that the glass substrate 130 of the feeding unit 210 can uprightly stand in the storage housing 110 of the storage platform 100 (as shown in FIG. 3D). Here, the servo motor can be employed to control the rotation angle and the rotation precision of the moveable pivot, and the mechanisms, such as the shaft coupling and so on can be employed to change the rotation direction of the moveable pivot of the moveable support plate 1102 for driving the moveable support plate 1102 to rotate. Finally, the storage housing 110 loaded with the glass substrate 130 can carry the glass substrate 130 from the transportation platform 200' to the storage platform 100, thereby completing the carry-in operation of the glass substrate 130.

Thus, the carry-in and carry-out operation of the glass substrate 130 of the present invention may be completed on the same transportation platform 200 as shown in FIGS. 2A and 2B, and also may be completed on the different transportation platforms 200, 200' as shown in FIGS. 3A and 3B.

To be a preferred embodiment of the glass substrate storage and transportation system of the present invention, the feeding unit 210 disposes a fine-tuning wheel (not shown in drawings, and its position being the same as the above-mentioned retaining portion 211), which is corresponding to the interval portion 1105 and is used for holding the glass substrate 130 and adjusting the position of the glass substrate 130. Here, the feeding unit 210 employs the fine-turning wheel to adjust the position of the glass substrate 130 so that making the carry-in and carry-out operation of the glass substrate 130 be more convenient and safe.

In the structural schematic views of the second preferred embodiment of the glass substrate storage and transportation system of the present invention shown by FIGS. 3A to 3D, the transportation platform specifically comprises a carry-out feeding unit for carrying the glass substrate out from the storage platform, a carry-out feeding guideway for determining the transporting direction of the carry-out feeding unit, a carry-in feeding unit for carrying the glass substrate into the storage platform, and a carry-in feeding guideway for determining the transporting direction of the carry-in feeding unit. The carry-in operation of the glass substrate is completed by the carry-in feeding unit and the carry-in feeding guideway, and the carry-out operation of the glass substrate is completed by the carry-out feeding unit and the carry-out feeding guideway. In the second preferred embodiment, the glass substrate storage and transportation system of the present invention can make the carry-in and carry-out operation of the glass substrate be simultaneously go on, and the exit opening and the entry opening may be located at different positions thereby avoiding the incorrect operations and largely improving the production efficiency of the manufacturer of the glass substrate.

Figure 4:
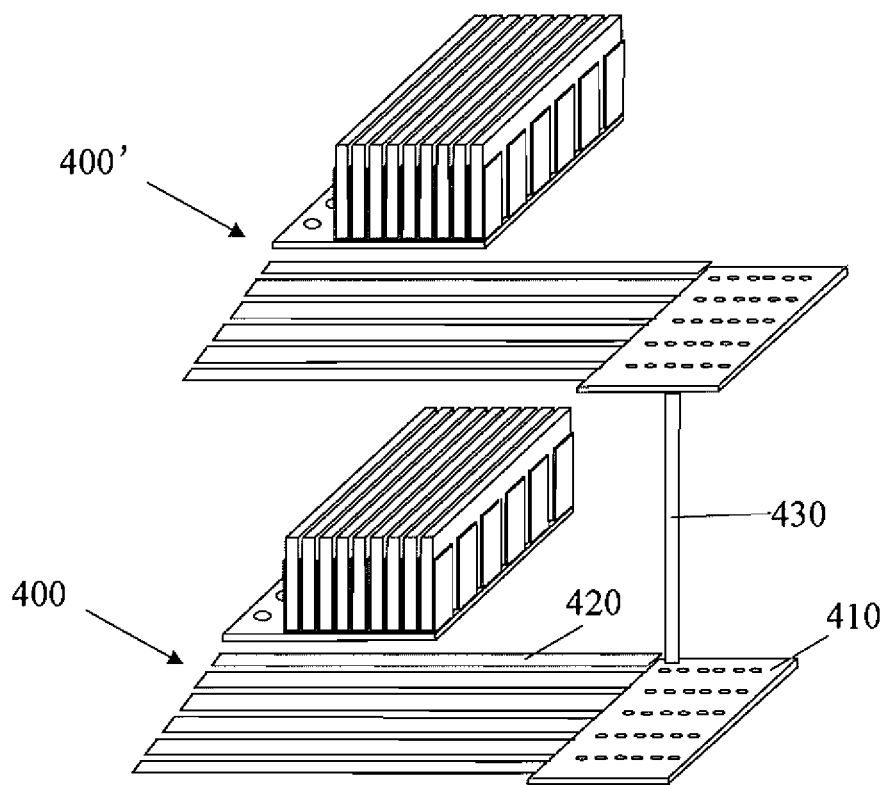
FIG. 4 is a structural schematic view of a third preferred embodiment of the glass substrate storage and transportation system of the present invention.

In a structural schematic view of a third preferred embodiment of the glass substrate storage and transportation system of the present invention shown by FIG. 4, the difference between it and the second embodiment shown by FIG. 3 is that: a transportation platforms 400, 400' shown in FIG. 4 form a layer structure and there disposes a vertical guideway 430 between the transportation platforms 400, 400'. The vertical guideway 430 is located on one end of a feeding guideway 420 of each of the transportation platforms 400, 400' and is used to make a feeding unit 410 move up and down. Because of disposing the vertical guideway 430, all of the feeding units 410 may move up and down. Thus, in the regions with the same area, the present invention can dispose the multi-layer glass substrate storage and transportation system. The transportation platforms of two adjacent layers may be connected by the vertical guideway 430, and there disposes an entry-exit opening of the glass substrate at an appropriate position of the vertical guideway 430 to make the worker carry the glass substrate out or in. The glass substrate storage and transportation system of the present invention adopts a three-dimensional, multi-layer and multi-row structure by the aid of the vertical guideway 430 to maximize the storage capacity thereby further saving the factory area taken up by the glass substrate storage and transportation system and enhancing the utilization rate of the factory area.

The glass substrate storage and transportation system of the present invention may realize the computerized management of the glass substrate storage and transportation by a CIM (Computer Integrated Manufacturing). For example, when the system receives the request for transporting the glass substrate, it can obtain the position of the glass substrate on the storage platform according to the preceding storage record, the retractable guideway can transport the glass substrate located at this position to the transportation platform, and then the transportation platform can automatically transport the glass substrate to the entry-exit opening of the glass substrate. The CMM realizes the coordinated work between the production schedule and control, the computer-aided design, the computer-aided manufacture, the computer-aided engineering and the computer-aided quality management, realizes the real computer unification management, and largely enhances the efficiency of the production management.

The glass substrate storage platform of the present invention compared with the traditional glass cassette may save about three-quarter volume. Moreover, the glass substrate storage platform of the present invention may largely reduce the defective glass substrate resulted by the dust particle. The specific implementation mode and the beneficial effect may refer to the abovementioned embodiments of the glass substrate storage and transportation system.

In conclusion, although the present invention has been disclosed by above preferred embodiments, above preferred embodiments are not used to limit the present invention. One of ordinary skills in the art also can make all sorts of improvements and amendments within the principles of the present invention. Therefore, the protection scope of the present invention should be based on the scope defined by the appended claims.

What is claimed is:

1. A glass substrate storage platform, characterized in that: the glass substrate storage platform comprising:
   a storage plate, a plurality of retractable guideways located on the storage plate and a plurality of storage housings for uprightly receiving a glass substrate;
   the storage housings being one-to-one corresponding to the retractable guideways, each of the storage housings being fixed on the corresponding retractable guideway, each of the storage housings including a fixed support plate for fixedly supporting the glass substrate, a moveable support plate for movably supporting the glass substrate and facing the fixed support plate and a bottom plate for connecting the fixed support plate and the moveable support plate;
   the fixed support plate and the moveable support plate being perpendicular to the storage plate, the bottom plate being parallel to the storage plate, and the bottom plate being connected to the corresponding retractable guideway;
   wherein the moveable support plate further includes at least two support portions and an interval portion formed between the two support portions;
   wherein the moveable support plate further includes a movable pivot for making the movable support plate be rotated relative to the bottom plate, and a relative rotation angle of the moveable support plate relative to the bottom plate is 0 to 90 degrees.

2. The glass substrate storage platform as claimed in claim 1, characterized in that: the storage plate is provided with a plurality of air holes located under the storage housings.

\* \* \* \* \*